United States Patent
Smith et al.

(10) Patent No.: US 11,586,938 B2
(45) Date of Patent: Feb. 21, 2023

(54) BUILDING MANAGEMENT SYSTEM HAVING KNOWLEDGE BASE

(71) Applicant: Carrier Corporation, Palm Beach Gardens, FL (US)

(72) Inventors: Fabrizio Smith, Rome (IT); Daniele Alessandrelli, Dublin (IE); Christos Sofronis, Rome (IT); Alberto Ferrari, Rome (IT); Jason Higley, Pittsford, NY (US); Francesco Leonardi, Albany, OR (US); Teems E. Lovett, Glastonbury, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 944 days.

(21) Appl. No.: 16/463,698

(22) PCT Filed: Nov. 21, 2017

(86) PCT No.: PCT/US2017/062779
§ 371 (c)(1),
(2) Date: May 23, 2019

(87) PCT Pub. No.: WO2018/098149
PCT Pub. Date: May 31, 2018

(65) Prior Publication Data
US 2019/0287000 A1   Sep. 19, 2019

Related U.S. Application Data

(60) Provisional application No. 62/425,692, filed on Nov. 23, 2016.

(51) Int. Cl.
*G06F 1/00* (2006.01)
*G06N 5/022* (2023.01)
(Continued)

(52) U.S. Cl.
CPC .............. *G06N 5/022* (2013.01); *G06N 5/04* (2013.01); *G05B 15/02* (2013.01);
(Continued)

(58) Field of Classification Search
CPC .......... G06N 5/022; G06N 5/04; G05B 15/02; G05B 2219/2614; G05B 2219/2642; G05B 2219/31334
(Continued)

(56) References Cited

U.S. PATENT DOCUMENTS 6,148,305 A * 11/2000 Ikegaya ................ G06F 16/258
6,167,316 A    12/2000 Loudeman et al.
(Continued)

FOREIGN PATENT DOCUMENTS

CN    103440309 A    12/2013
CN    105205148 A    12/2015
(Continued)

OTHER PUBLICATIONS

Chinese Office Action for Application No. 201780072582.6; dated Jan. 26, 2022; 9 Pages.
(Continued)

*Primary Examiner* — Volvick Derose
(74) *Attorney, Agent, or Firm* — Cantor Colburn LLP

(57) ABSTRACT

A building management system for a building system includes a building system interface configured to receive building system data; a knowledge base configured to receive the building system data, the knowledge base providing a model of the building system, the model including semantic descriptions of the building system data, the semantic descriptions of the building system data being arranged in an ontology; and a user interface configured to access the knowledge base.

6 Claims, 4 Drawing Sheets

(51) Int. Cl.
*G06N 5/04* (2023.01)
*G05B 15/02* (2006.01)

(52) U.S. Cl.
CPC .............. *G05B 2219/2614* (2013.01); *G05B 2219/2642* (2013.01); *G05B 2219/31334* (2013.01)

(58) Field of Classification Search
USPC .......................................................... 706/11
See application file for complete search history.

(56) References Cited

U.S. PATENT DOCUMENTS

| | | | |
|---|---|---|---|
| 6,973,410 B2 | 12/2005 | Siegel | |
| 7,895,257 B2 | 2/2011 | Helal et al. | |
| 8,117,233 B2 | 2/2012 | Liu et al. | |
| 8,522,195 B2 | 8/2013 | Miloslavsky et al. | |
| 8,682,921 B2 | 3/2014 | Park et al. | |
| 8,818,930 B2 | 8/2014 | Yanase | |
| 9,111,088 B2 | 8/2015 | Ghai et al. | |
| 9,116,978 B2 | 8/2015 | Park et al. | |
| 9,157,647 B2 | 10/2015 | Leen et al. | |
| 9,189,527 B2 | 11/2015 | Park et al. | |
| 11,348,019 B2 * | 5/2022 | Rayes | G06N 5/04 |
| 2002/0072982 A1 | 6/2002 | Barton et al. | |
| 2007/0236346 A1 * | 10/2007 | Helal | H04L 12/2803 340/539.22 |
| 2008/0228812 A1 | 9/2008 | Oglesby et al. | |
| 2009/0177634 A1 * | 7/2009 | Behrendt | G06F 16/00 |
| 2010/0324927 A1 | 12/2010 | Tinsley | |
| 2010/0324962 A1 * | 12/2010 | Nesler | H02J 13/0062 705/412 |
| 2011/0078107 A1 | 3/2011 | Almeida et al. | |
| 2011/0273283 A1 | 11/2011 | Schmuttor | |
| 2012/0011126 A1 * | 1/2012 | Park | G06F 9/541 707/769 |
| 2012/0011141 A1 * | 1/2012 | Park | G06F 16/24522 707/E17.069 |
| 2012/0110158 A1 | 5/2012 | Koch et al. | |
| 2012/0203806 A1 | 8/2012 | Panushev | |
| 2013/0238795 A1 | 9/2013 | Geffin et al. | |
| 2013/0261833 A1 | 10/2013 | Meghani et al. | |
| 2013/0268317 A1 | 10/2013 | Mattila | |
| 2013/0339104 A1 | 12/2013 | Bose | |
| 2014/0058539 A1 | 2/2014 | Park | |
| 2014/0067133 A1 * | 3/2014 | Liu | G05D 23/19 700/276 |
| 2014/0149249 A1 | 5/2014 | Goad et al. | |
| 2014/0207759 A1 | 7/2014 | Park et al. | |
| 2014/0337010 A1 | 11/2014 | Akolkar et al. | |
| 2014/0344718 A1 | 11/2014 | Rapaport et al. | |
| 2015/0113462 A1 * | 4/2015 | Chen | G06Q 10/06 715/771 |
| 2015/0253748 A1 | 9/2015 | Brun et al. | |
| 2015/0294543 A1 | 10/2015 | Ricks | |
| 2016/0026631 A1 | 1/2016 | Salam et al. | |
| 2016/0197769 A1 | 7/2016 | Britt et al. | |
| 2016/0224645 A1 | 8/2016 | Dang | |
| 2017/0315697 A1 * | 11/2017 | Jacobson | G06F 16/26 |
| 2017/0366414 A1 * | 12/2017 | Hamilton | H04L 41/145 |
| 2018/0114140 A1 * | 4/2018 | Chen | G06N 5/022 |

FOREIGN PATENT DOCUMENTS

| | | |
|---|---|---|
| CN | 105677795 A | 6/2016 |
| EP | 2043009 A1 | 4/2009 |
| WO | 2005052720 A2 | 6/2005 |
| WO | 2012091541 A1 | 7/2012 |
| WO | 2012177630 A1 | 12/2012 |
| WO | 2013173108 A1 | 11/2013 |
| WO | 2015011446 A1 | 1/2015 |

OTHER PUBLICATIONS

International Search Report and Written Opinion for application PCT/US2017/062779, dated Feb. 21, 2018, 13 pages.

* cited by examiner

BUILDING MANAGEMENT SYSTEM HAVING KNOWLEDGE BASE

TECHNICAL FIELD

The subject matter disclosed herein relates generally to building management systems, and more particularly to a building management system having a knowledge base and a method of creating the knowledge base.

BACKGROUND

A building management system may be used to read building system data from a building system and to write building system data to a building system. For example, in an HVAC application, a building management system may be used to read existing chiller water temperatures and to write an updated chiller water temperature set point to the chiller controller. Existing building management systems are highly diversified in terms of: 1) data representation and technological frameworks; 2) terminology and conceptual models; and 3) protocols and communication channels to access managed devices. As a result, building management systems are independent silos, i.e., isolated data stores incapable of reciprocal operation with each-other, even when managing the same building/site.

BRIEF DESCRIPTION

According to one embodiment, a building management system for a building system includes a building system interface configured to receive building system data; a knowledge base configured to receive the building system data, the knowledge base providing a model of the building system, the model including semantic descriptions of the building system data, the semantic descriptions of the building system data being arranged in an ontology; and a user interface configured to access the knowledge base.

In addition to one or more of the features described above, or as an alternative, further embodiments may include a semantic registration module configured to generate metadata in response to the building system data.

In addition to one or more of the features described above, or as an alternative, further embodiments may include wherein the metadata is generated at least one of manually, semi-automatically or automatically.

In addition to one or more of the features described above, or as an alternative, further embodiments may include wherein the metadata and building data are combined to create the semantic descriptions of the building system data.

In addition to one or more of the features described above, or as an alternative, further embodiments may include a semantic service module in communication with the semantic registration module, the semantic service module configured to generate commands to access the knowledge base.

In addition to one or more of the features described above, or as an alternative, further embodiments may include a semantic service module in communication with the user interface, the semantic service module configured to generate commands to access the knowledge base.

In addition to one or more of the features described above, or as an alternative, further embodiments may include wherein the commands to access the knowledge base include read and write commands.

According to another embodiment, a method of creating a knowledge base for a building system includes receiving building system data; generating metadata in response to the building system data; combining the metadata and building system data to generate a semantic description of the building system data; and storing the semantic description of the building system data in an ontology of the knowledge base, the knowledge base providing a model of the building system.

In addition to one or more of the features described above, or as an alternative, further embodiments may include wherein the metadata is created at least one of manually, semi-automatically or automatically.

In addition to one or more of the features described above, or as an alternative, further embodiments may include wherein storing the semantic description of the building system data in the ontology of the knowledge base includes accessing as semantic service module to generate commands to access the knowledge base.

In addition to one or more of the features described above, or as an alternative, further embodiments may include providing a user interface configured to access the knowledge base.

In addition to one or more of the features described above, or as an alternative, further embodiments may include providing a semantic service module in communication with the user interface, the semantic service module configured to generate commands to access the knowledge base.

In addition to one or more of the features described above, or as an alternative, further embodiments may include wherein the commands to access the knowledge base include read and write commands.

Technical effects of embodiments of the disclosure include the providing of a knowledge base including semantic descriptions of building system data. The knowledge base includes an ontology that models a physical building system.

These and other advantages and features will become more apparent from the following description taken in conjunction with the drawings.

DETAILED DESCRIPTION

Figure 1:
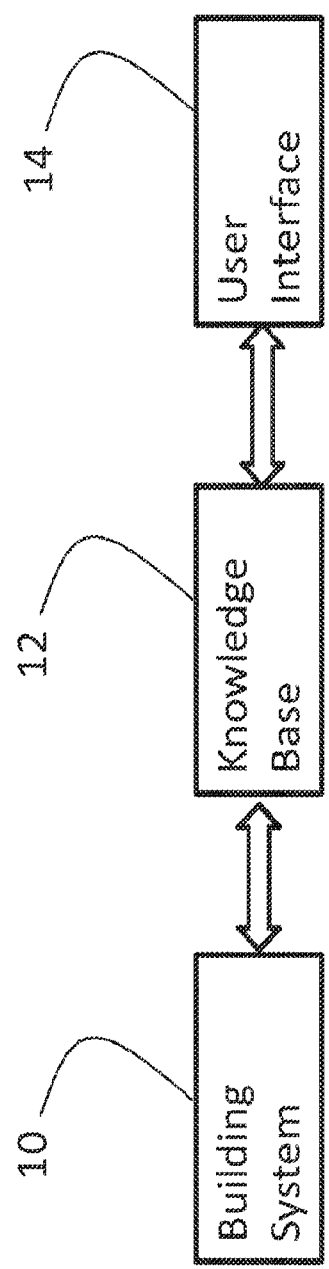
FIG. 1 depicts a building management system in an embodiment.

FIG. 1 is a high-level depiction of a building management system in an embodiment. A building system 10 corresponds to the physical building system(s) that are managed by the building management system. The building system 10 may include building systems across a disparate set of domains such as HVAC, building transportation, security, safety, etc. The building system 10 incorporates building system data which includes a wide variety of data types, including but not limited to, how building system elements are arranged, measurements of variables, control values for set points, etc.

A knowledge base 12 is provided to store building system data which provides a semantically-enriched representation of building systems (including physical and logical components, data and event sources). The knowledge base 12 may be embodied on a microprocessor-based device having a memory, such as a computer server. Computer-implemented modules or services may be used to populate and access the knowledge base 12, as described in further detail herein. The building system data from building system 10 is processed to form semantic descriptions of the building system data. The semantic descriptions of the building system data are stored in ontologies in knowledge base 12. In addition to variables and control values, the knowledge base 12 includes a model of the building system 10 across different domains (HVAC, building transportation, security, safety, etc.). Through the semantic descriptions and the ontology, entities (e.g., equipment, devices, zones, spaces, event sources, data sources, sensors, commands, configuration parameters) and their relationships are defined in the knowledge base 12.

A user interface 14 is used to access the knowledge base 12 in response to user queries. The user interface 14 may be implemented using an application program interface (API) accessible over a network such as a LAN, WAN, global network (e.g., Internet), etc. The user interface 14 provides an interface for submission of queries to knowledge base 12 and for providing the response to queries, among other actions described herein.

Figure 2:
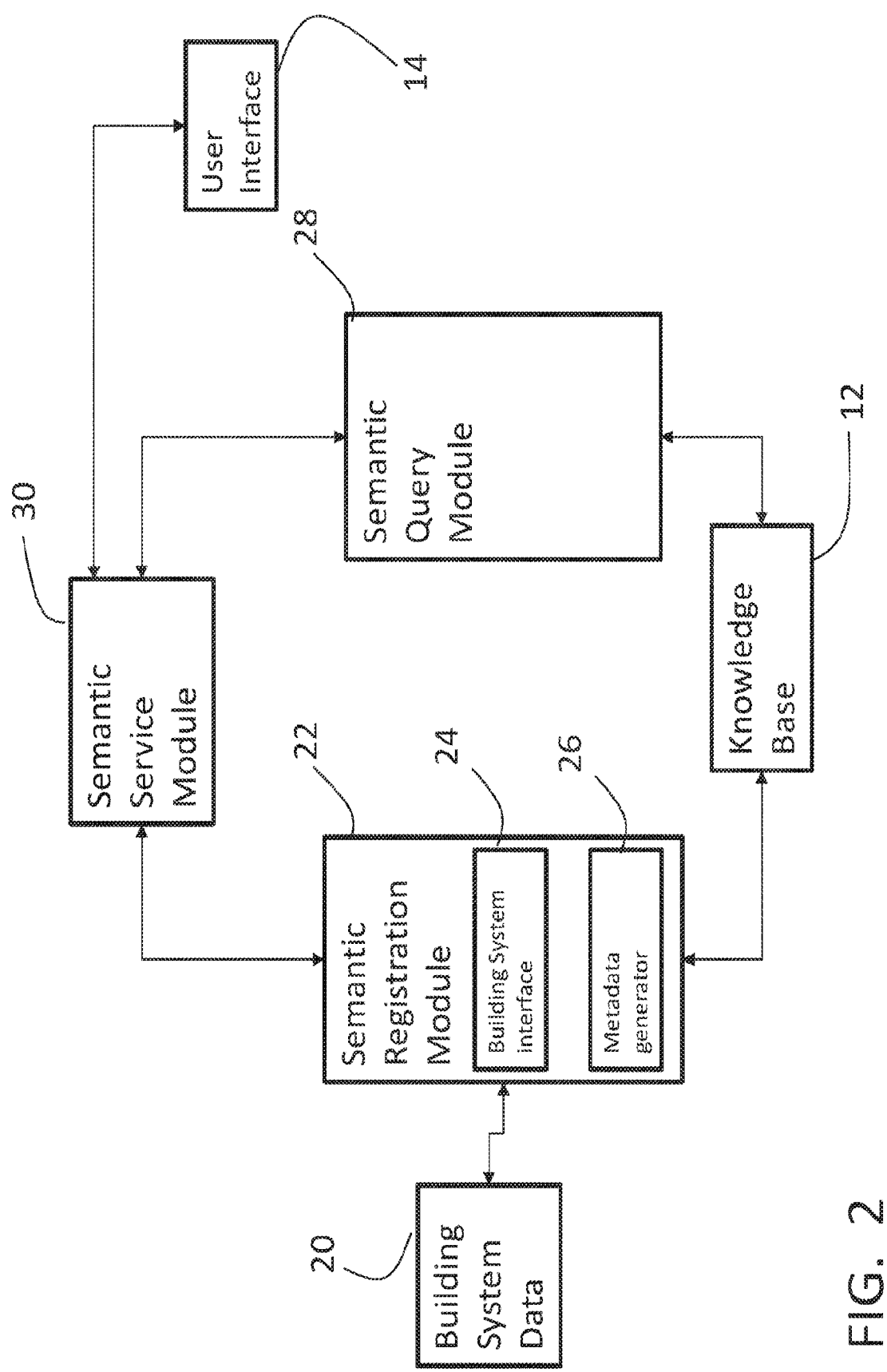
FIG. 2 depicts components for creating and accessing a knowledge base in an embodiment.

FIG. 2 depicts components for creating and accessing the knowledge base 12 in an embodiment. As shown in FIG. 2, building system data 20, from building system 10, is provided to a semantic registration module 22. As noted above, the building system data 20 includes how building system elements are arranged, measurements of variables, control values for set points, etc. The semantic registration module 22 may be implemented by a software application executing on a microprocessor-based device having a memory, such as a computer server. The semantic registration module 22 includes a building system interface 24 that communicates with the various building systems 10. The building system interface 24 may include a variety of interfaces to communicate with disparate building systems. For example, a first interface may communicate with an elevator system and a second interface may communicate with a security system.

A semantic service module 30 may be used to create commands for interfacing with the knowledge base 12, to invoke functionalities of the semantic registration module 22 and to interface with a semantic query module 28. The semantic service module 30 provides mechanisms to populate the knowledge-base 12 by gathering building systems data through building system interfaces. The semantic query module 28 makes available to user applications functionalities to retrieve and update the semantic data previously described. The semantic service module 30 may be embodied on a microprocessor-based device having a memory, such as a computer server. In one embodiment, the semantic service 30 may serve as a RESTful endpoint to provide GET (e.g., get all chillers' temperature sensor), PUT (e.g., add the location of a given device), POST (e.g., register a new installed system) or DELETE (e.g., remove all the data related to a given device) commands in a format recognized by the knowledge base 12. Beyond a well-defined API providing a core set of functionalities, the semantic service module 30 may also provide more general mechanisms for accessing knowledge-base contents, including: a structured query language based on SQL, NoSQL, or SPARQL; natural language sentences; full-text search requests (i.e., sets of keywords).

The building system data 20 received at building interface 24 is provided to a metadata generator 26 to add metadata to the building system data 20 to provide a semantic description of the building system data 20. The metadata generator 26 may employ manual, semi-automatic or automatic techniques to create the semantic description of the building system data. If the building system data lacks a structured data model or well defined interfaces, mappings between naming conventions adopted in the building system data 20 and reference terminology provided in the ontology of the knowledge base 12 are defined manually by user. In other embodiments, the adding of metadata to create the semantic descriptions of the building system data 20 may be performed in a semi-automated manner, where natural language processing techniques, probabilistic models, or machine learning algorithms can be used to support users. In cases where the building system data 20 organizes and exposes information through a structured data model, model transformation techniques can be applied to generate a semantic description of the building system data 20 according to the ontology of the knowledge base 12.

The semantic query module 28 receives requests from the semantic service module 30 and generates proper queries and inferences to be executed on top of the knowledge base 12. The semantic query module 28 may be embodied on a microprocessor-based device having a memory, such as a computer server. The semantic query module 28 includes a query engine, a reasoner to perform inference on the knowledge base 12, and an indexing engine to speed up queries and retrieve data by keywords. The semantic query module 28 provides: (1) retrieval of metadata related to system entities matching particular criteria, (e. g., get all the card reader in a given space); (2) identification of systems' data sources filtered according to properties defined in the ontology (e.g., get all the water temperature data points related to chillers, get all the access event occurring in a given floor); (3) description of data sources capabilities, in terms of: addressing information to identify the data source in the source system, characterization of the manipulated physical property, related "tags", classification (sensor point, command point, parameter point, event point), allowed values; (4) normalization of data read from (or written to) systems' data sources according to the semantic mappings defined in the knowledge-base 12 between the values supported by a given system and the reference ones defined in the ontology. The semantic query module 28 also provides functionalities to add, update and remove facts from the knowledge-base, as well for updating the ontology, managing the overall consistency.

The knowledge base 12 is populated with a semantic representation (conforming to the ontology of the knowledge base) of the various building system entities and their relations. An example embodiment can be based on the use of RDF as generic data model for the representation of the building systems as semantic graphs, where various entities occurring in the building systems are related to each other and mapped to the ontology according to a linked data architecture. Examples of information provided by the ontology of the knowledge base 12 include, but are not limited to, the structure of a building (floors, room, etc.); the devices installed in the building located into spaces; relationships among equipment pieces (e.g., a specific air handling unit serves a specific variable air volume box); an annotated description of I/O, commands and configurable parameters provided by each device, together with the related source system addressing information.

In addition to storing semantic descriptions of building system data 20, the knowledge base 12 provides a reference model for the building system 10, encoded in a machine-processable ontology language, describing building entities and relationships relevant to each addressed domain (e.g., HVAC, building transportation, security, safety). The implementation of such a reference model may rely on formal/ logic-based languages (e.g., OWL/RDF, description logics, datalog variants, F-logic) that enable automated inference and efficient query capabilities. Access to the knowledge base 12 may be made through semantic query languages, such as SPARQL.

Figure 3:
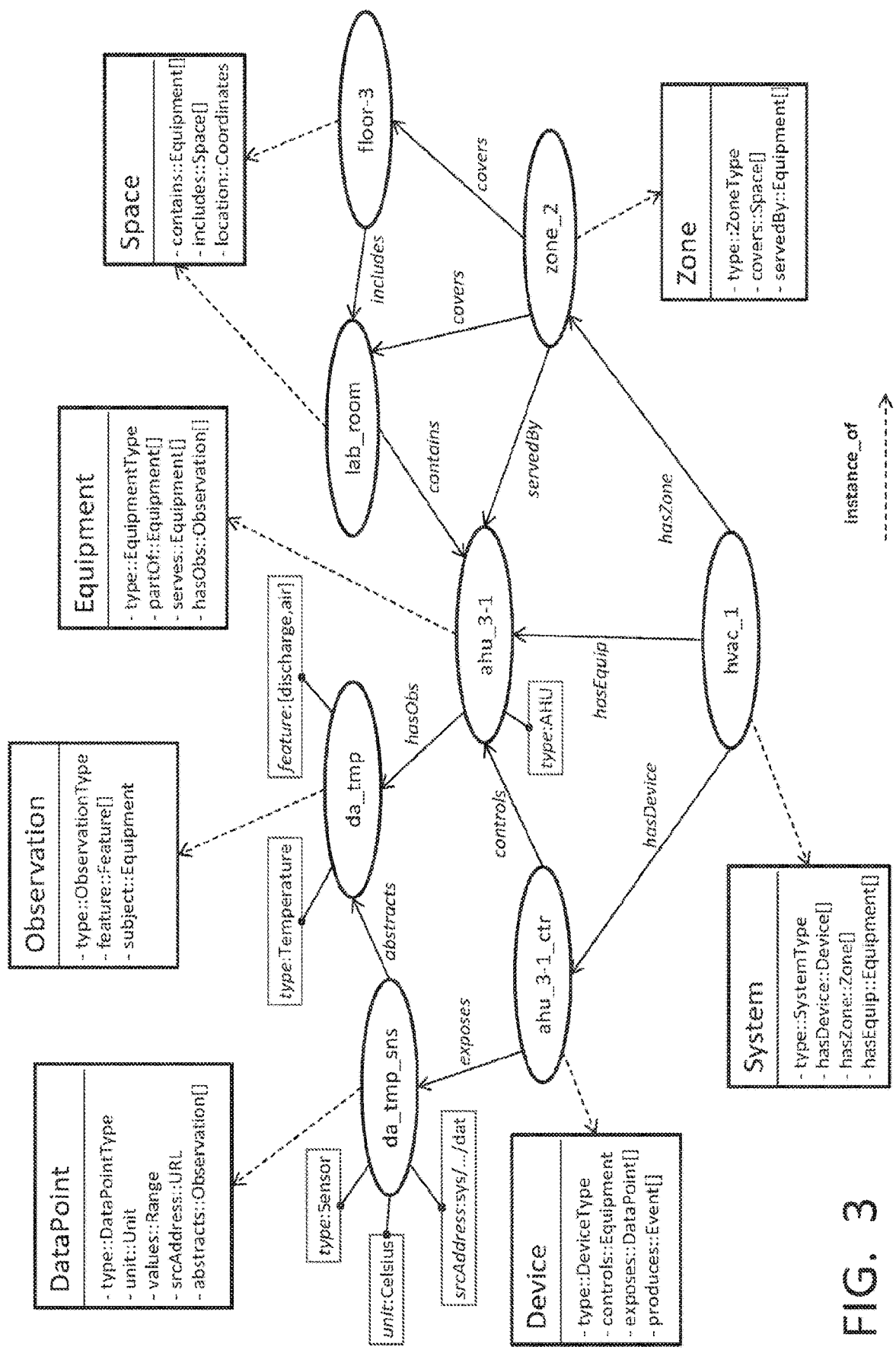
FIG. 3 depicts entries in the knowledge base in an embodiment.

FIG. 3 illustrates example entries in the knowledge base 12. The entries correspond to semantic descriptions of building system data 20 arranged according to the conceptual model provided by the ontology. Each entry in the knowledge base 12 may correspond to a variety of data types, such as a data point, property, device, equipment, etc. The relationships between the semantic descriptions of the building system data 20 provide the model of the building system 10 by identifying how elements are organized and related. The entries in the knowledge base 12 may be identified using unique identifiers, such as RDF identifiers.

The ontology of the knowledge base 12 provides a model of the business system 10 by interrelating entries in the knowledge base 12, to provide an organization and representation of the physical business system 10. The ontology defines and models entities such as spaces (e.g., physically-delimited areas such as sites, buildings, floors, etc.), equipment (e.g., mechanical devices that compose a system (e.g., chillers, AHUs, access doors, etc.)), devices (e.g., electronic devices that provide I/O or data elaboration functionality (e.g., actuators, systems on a chip, sensor devices, etc.)) and information objects (e.g., information entities associated with devices and possibly representing inputs, outputs, configuration parameters, events, etc.). It is understood that the ontology of the knowledge base 12 may define and model a wide variety of entities, and embodiments are not limited to the examples provided in this disclosure.

Figure 4:
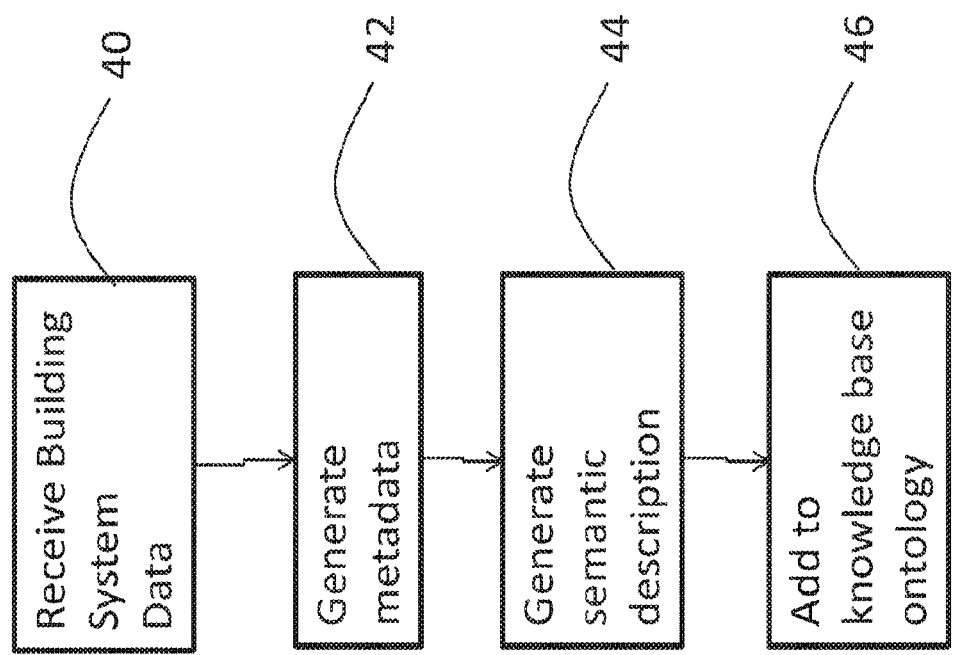
FIG. 4 depicts a process to add building system data to the knowledge base in an embodiment.

FIG. 4 depicts a process for adding building system data 20 to the knowledge base 12. The process at begins 40 where building system data 20 is received at building system interface 24. At 42, the metadata is generated for the business system data 20. As described above, the metadata may be generated manually, semi-automatically or automatically. Once the metadata is created, the semantic description is created at 44 by combining the metadata and building system data 20. The semantic description combines the business system data and the metadata into a format suitable for storage in the knowledge base 12. The semantic registration module 22 may access the semantic service module 30 in creating the semantic description of the business system data 20. At 46, the semantic description is added as an entry to the ontology of the knowledge base 12.

Once the knowledge base 12 is populated, it may be accessed by users. The user interface 14 allows for access to the knowledge base 12. The user interface 14 may be embodied on a microprocessor-based device having a memory, such as a computer server. Users may access the user interface 14 remotely via a network. The user interface 14 provides for retrieval of business system data related to entities matching particular criteria, via the semantic service module 30 and the semantic query engine 28. The user interface 14 allows users to enter semantic queries (e. g., get all the sensor data related to air temperature in a given space). The semantic service module 30 converts the user semantic query to a command (e.g., GET) which is used by the semantic query engine 28 to access the knowledge base 12. The user interface 14 also provides full-text search, to issue requests formulated as sets of keywords. The user interface 14 also provides for the update of the knowledge-base 12 contents (addition/removal of metadata).

The knowledge base provides for representing building system entities and data sources in a structured and semantically-enriched manner. Semantic relations between these entities are established and managed using technologies allowing for a scalable navigation and querying response times. A single entry-point (e.g., the user interface) is provided to access the knowledge base, leveraging execution performance with specific techniques (e.g., those proposed in the Semantic Web and Knowledge Representation fields) in order to query for data sources across systems, infer new information by means of domain-specific rules, allow users to add custom annotations and tags. User applications can focus on value-adding solutions identifying and accessing data from heterogeneous systems in a uniform way.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

The invention claimed is:

1. A building management system for a building system, the building management system comprising:
   a building system interface configured to receive building system data;
   a knowledge base configured to receive the building system data, the knowledge base providing a model of the building system, the model including semantic descriptions of the building system data, the semantic descriptions of the building system data being arranged in an ontology; and
   a user interface configured to access the knowledge base;
   a semantic registration module configured to generate metadata in response to the building system data;
   a semantic query module configured to make available to user applications functionalities to retrieve and update the semantic descriptions of the building system data;
   a semantic service module in communication with the user interface, the semantic registration module and the semantic query module, the semantic service module configured to generate commands to access the knowledge base, to invoke functionalities of the semantic registration module and to interface with the semantic query module;
   wherein the metadata and building data are combined to create the semantic descriptions of the building system data;
   wherein the semantic service module provides mechanisms to populate the knowledge base by gathering the building system data through the building system interface; and
   wherein the semantic query module receives requests from the semantic service module and generates proper queries to be executed on top of the knowledge base.

2. The building management system of claim 1, wherein: the metadata is generated at least one of manually, semi-automatically or automatically.

3. The building management system of claim 1, wherein: the commands to access the knowledge base include read and write commands.

4. A method of creating a knowledge base for a building system, the method comprising:
- receiving building system data;
- generating, by a sematic registration module, metadata in response to the building system data;
- combining the metadata and building system data to generate a semantic description of the building system data; and
- storing the semantic description of the building system data in an ontology of the knowledge base, the knowledge base providing a model of the building system, the model including the semantic descriptions of the building system data;
- providing a user interface configured to access the knowledge base;
- providing a semantic query module configured to make available to user applications functionalities to retrieve and update the semantic descriptions of the building system data; and
- providing a semantic service module in communication with the user interface, the semantic query module and the semantic registration module, the semantic service module configured to generate commands to access the knowledge base, to invoke functionalities of the semantic registration module and to interface with the semantic query module;
- wherein storing the semantic description of the building system data in the ontology of the knowledge base includes accessing the semantic service module to generate commands to access the knowledge base;
- wherein the semantic service module provides mechanisms to populate the knowledge base by gathering the building system data; and
- wherein the semantic query module receives requests from the semantic service module and generates proper queries to be executed on top of the knowledge base.

5. The method of claim 4, wherein:
the metadata is created at least one of manually, semi-automatically or automatically.

6. The method of claim 4, wherein:
the commands to access the knowledge base include read and write commands.

* * * * *